(12) United States Patent
Gill et al.

(10) Patent No.: US 7,561,759 B2
(45) Date of Patent: Jul. 14, 2009

(54) OPTICAL MODULATOR

(75) Inventors: Douglas M. Gill, South Orange, NJ (US); Mahmoud Rasras, New Providence, NJ (US); Sanjay Patel, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/428,031

(22) Filed: Jun. 30, 2006

(65) Prior Publication Data
US 2008/0013876 A1    Jan. 17, 2008

(51) Int. Cl.
*G02F 1/01* (2006.01)
(52) U.S. Cl. .................................. 385/1; 385/2; 385/3
(58) Field of Classification Search .................. None
See application file for complete search history.

(56) References Cited

U.S. PATENT DOCUMENTS

| | | | |
|---|---|---|---|
| 6,341,184 B1 * | 1/2002 | Ho et al. .......................... | 385/3 |
| 6,856,751 B2 * | 2/2005 | Oaknin et al. ................ | 385/140 |
| 2003/0072534 A1 * | 4/2003 | Bona et al. ..................... | 385/40 |
| 2003/0235367 A1 * | 12/2003 | Yamazaki ...................... | 385/39 |
| 2004/0228564 A1 * | 11/2004 | Gunn et al. ..................... | 385/1 |
| 2005/0271315 A1 * | 12/2005 | Gan et al. ....................... | 385/8 |
| 2006/0051010 A1 * | 3/2006 | Chu et al. ....................... | 385/5 |
| 2007/0189338 A1 * | 8/2007 | Seelert et al. ................... | 372/6 |

* cited by examiner

*Primary Examiner*—Sung H Pak
*Assistant Examiner*—Chad H Smith

(57) ABSTRACT

Optical modulator devices exhibiting improved response characteristics are constructed from a ring resonator having a tunable loss element positioned within the ring resonator structure and one or more phase shifters. By tuning and/or controlling the loss within the resonator, desired modulator response characteristics are obtained.

13 Claims, 11 Drawing Sheets

900(a)

US 7,561,759 B2

OPTICAL MODULATOR

FIELD OF THE INVENTION

This invention relates generally to the field of optical communications and in particular to optical structures exhibiting improved response characteristics.

BACKGROUND OF THE INVENTION

Optical resonator structures have been used to construct a variety of optical devices, including optical modulators. One problem with these devices is that they frequently exhibit non-ideal response characteristics and in particular they oftentimes exhibit a response ripple.

SUMMARY OF THE INVENTION

In accordance with the principles of the invention, optical modulator devices exhibiting improved response characteristics are constructed with a ring resonator having a tunable loss element positioned within the ring resonator structure. By tuning and/or controlling the loss within the resonator, a modulator response closer to an ideal response is obtained.

In accordance with an aspect of the invention, an optical modulator employing two concatenated ring resonator structures with tunable loss is described which exhibits more desirable response characteristics.

In accordance with yet another aspect of the invention, a balanced Mach-Zehnder modulator (MZ) employing two ring resonator structures with tunable loss in each arm of the MZ is described which exhibits a linearized response.

Advantageously, device ripple and/or response deviation from an ideal response may be further reduced by appropriately adjusting the loss of the resonator employed in the modulator device.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
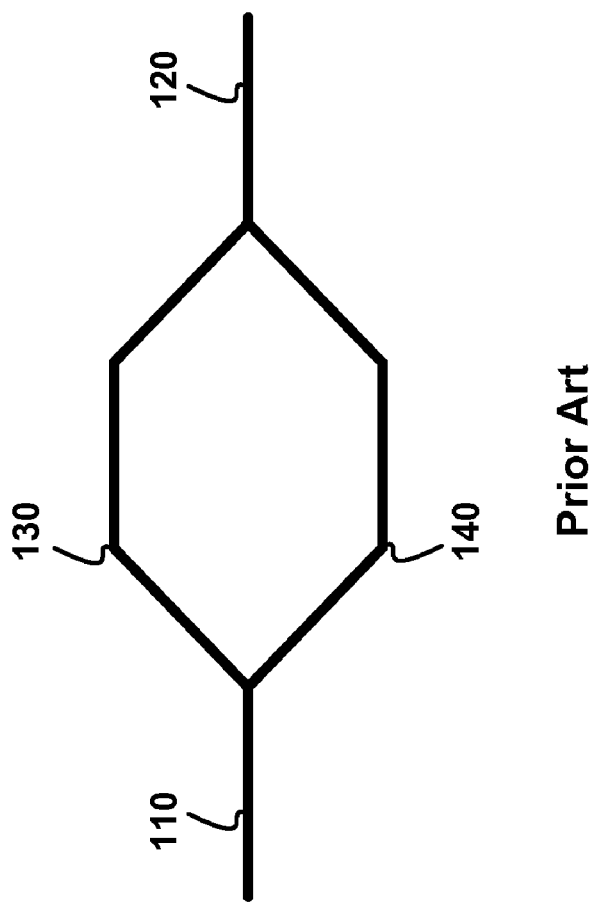
FIG. 1 is a schematic of a PRIOR ART optical Mach-Zehnder modulator.

FIG. 1 shows a schematic of an optical apparatus 100 which is known to those skilled in the art as a Mach-Zehnder modulator. Such optical modulators are one of the key components for signal transmission systems and a number of types are known and understood. As can be appreciated, the simplicity of the Mach-Zehnder modulator contributes to its wide utilization in optical systems.

With continued reference to that FIG. 1, it may be observed that a Mach-Zehnder modulator includes an input waveguide 110 and an output waveguide 120, optically connected by a pair of waveguide arms 130, and 140. Accordingly, an optical signal applied to the input waveguide 110 will exit the output waveguide 120 after traversing the modulator via upper arm 130 and/or lower arm 140.

Figure 2:
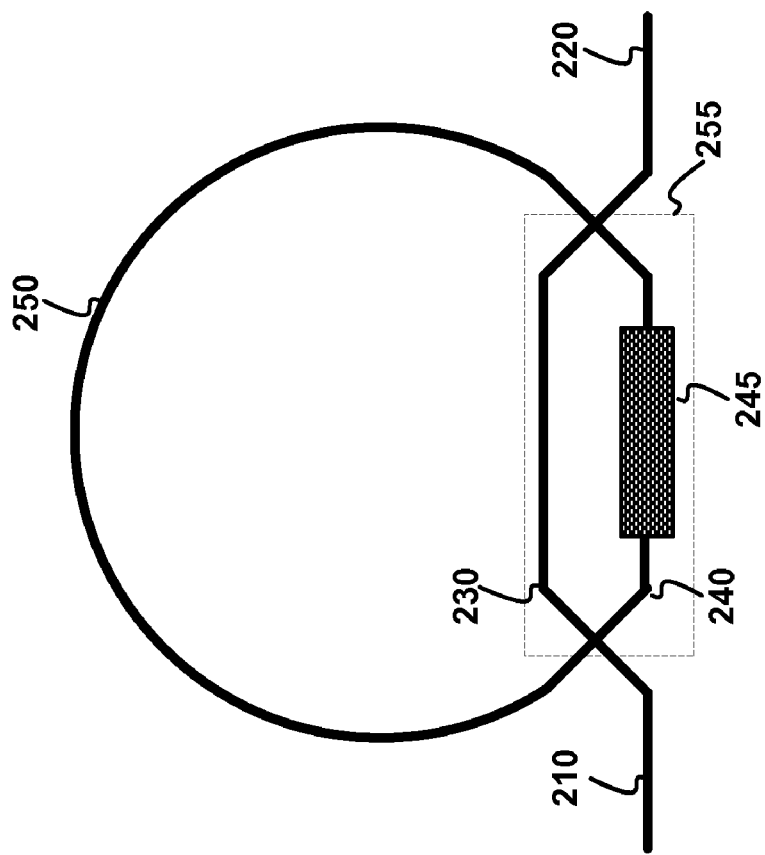
FIG. 2 is a schematic of an optical modulator including a resonator according to the present invention.

Turning now to FIG. 2, there it shows a modulator 200 such as that shown in FIG. 1, having an input waveguide 210 connected to an output waveguide 220, by an upper arm 230, and a lower arm 240, with the addition of a ring resonator 250 optically coupled to the modulator by a tunable coupler 255, and a phase shifter 245, shown coupled to the lower arm of the modulator. While in this example the phase shifter 245 is shown coupled to the lower arm of the modulator, according to the present invention, it may be coupled to either of the two arms—or both arms—depending upon the particular application.

It should be noted that when configured in this manner, the familiar Mach-Zehnder structure effectively operates as the tunable coupler 255. Additionally, and as can be readily appreciated by those skilled in the art, while we have shown the resonator structures independently from the arms of the Mach-Zehnder structure for clarity, for the purposes of the present invention it is only necessary that they be in optical communication with the arms and therefore their location(s) may be internal or external to such arms. Finally, while we have shown explicit ring resonator structures in this example, other resonator structures are effective as well according to the present invention.

Figure 3:
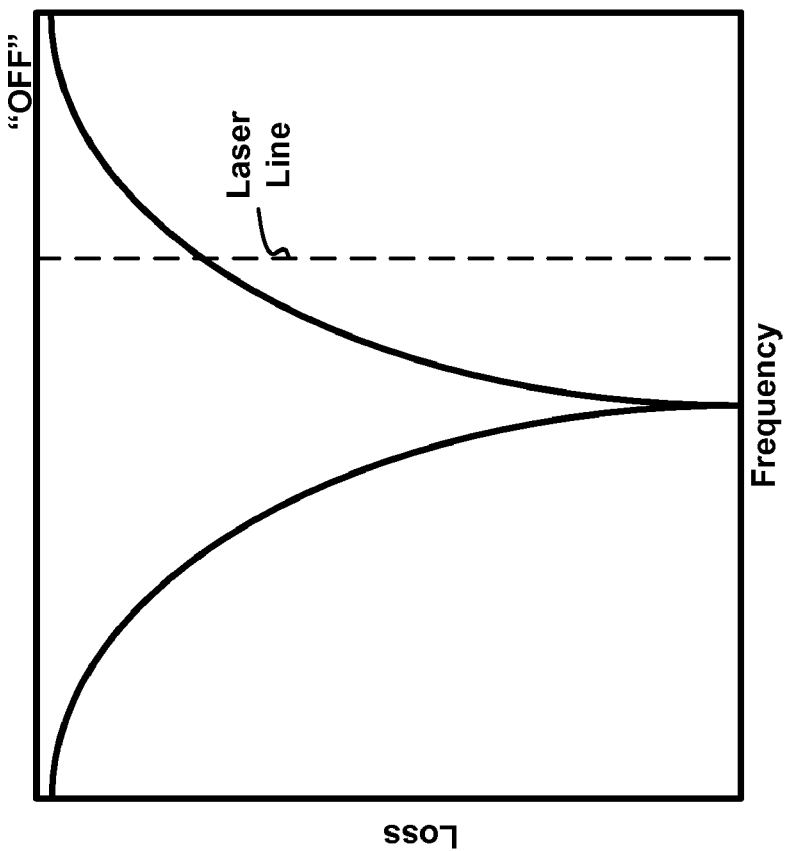
FIG. 3(*a*) and FIG. 3(*b*) are graphs showing ring modulator frequency coincident with (3(*a*)) and offset from (3(*b*)) a laser line, respectively.
Figure 3:
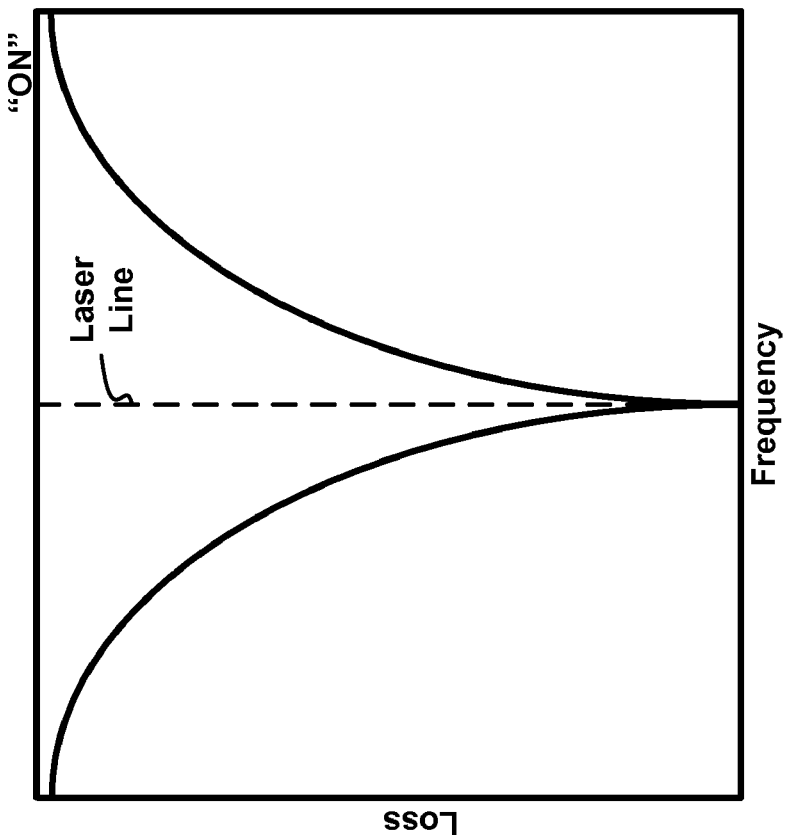

When a ring resonator such as that shown in FIG. 2 is used to effect optical modulation, the resonance location of the ring (in frequency space) is moved such that it is either coincident with, or offset from a laser line. When location is coincident with the laser line then the device will be in an "on" state and conversely when the location is offset from the laser line then the device will be in an "off" state. Such coincidence and offset is shown graphically in FIG. 3(a) and FIG. 3(b), respectively.

The linearity of the response of such a modulator may be advantageously improved when two ring resonators are concatenated. Such a concatenated configuration is shown schematically in FIG. 4. More specifically, a first modulator, similar to that shown in FIG. 2, has an input waveguide 410 connected to an output waveguide 420, by an upper arm 430, and a lower arm 440, with the addition of a ring resonator 450 optically coupled to the modulator by a tunable coupler 455, and a phase shifter 445, shown coupled to the lower arm of the modulator. As can be observed from FIG. 4, the output of a first modulator 420 is coupled to the input of a second modulator 460, the second modulator including an upper waveguide arm 470 and a ring resonator 490, respectively, connecting the input waveguide 460 to an output waveguide 497. The ring resonator 490 is optically coupled to the modulator by a tunable coupler 495, and the overall output of such a concatenated structure appears at the output 497 of the second modulator.

Figure 4:
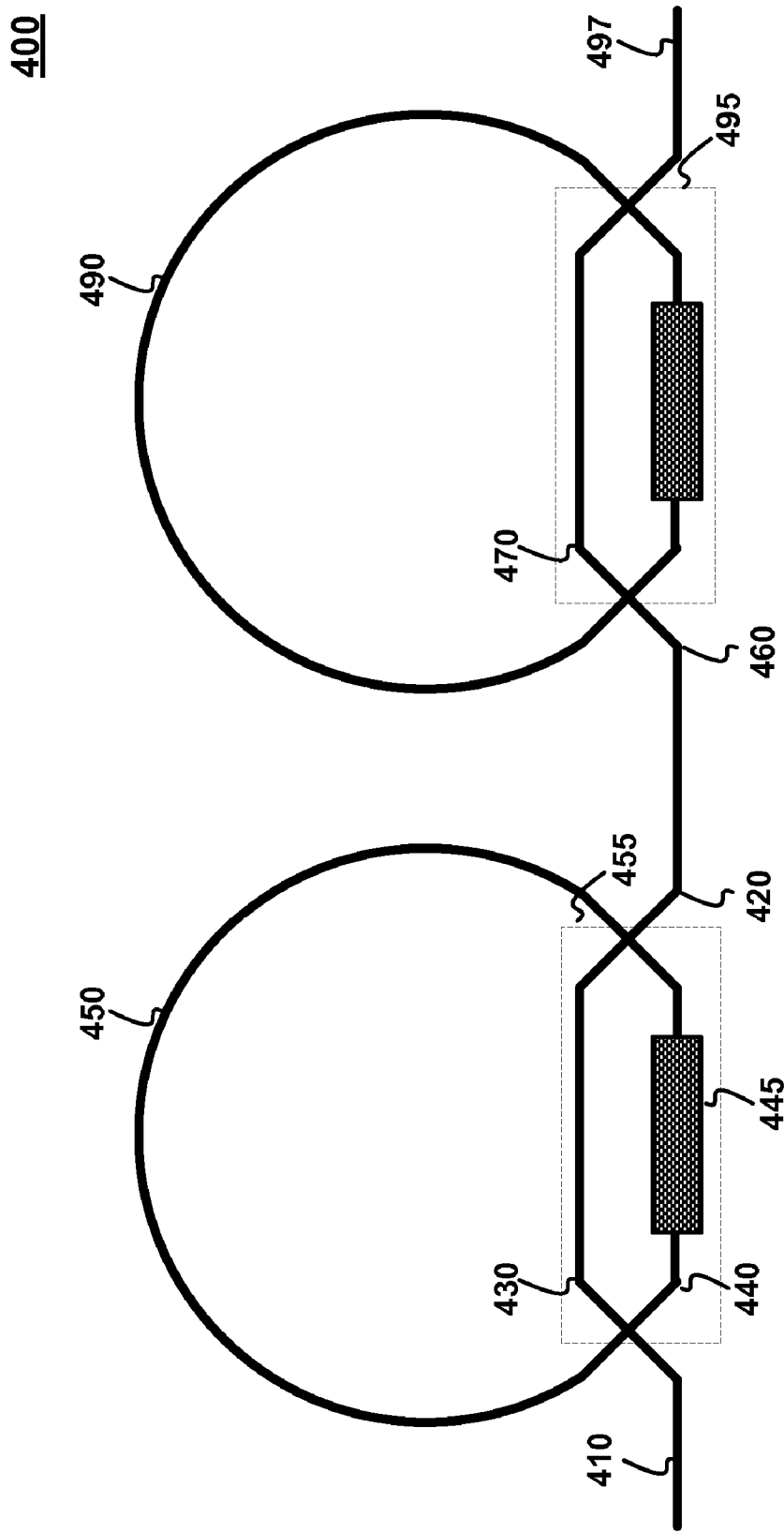
FIG. 4 is a schematic of a concatenated pair of modulators with ring resonators according to the present invention.

Despite improved linearity characteristics, a device such as that shown in FIG. 4 will still exhibit some deviation from linearity. According to the present invention, an improved response may be obtained by positioning one or more tunable loss elements within the ring resonators.

Advantageously, and according to the present invention, by tuning/controlling the loss contributed by/realized within each resonator, a response nearer to an ideal response—in this example linearity—may be obtained. Of further advantage afforded by the present invention, greater flexibility in the device output (for example, a greater variety of slope) is realized as well.

Figure 5:
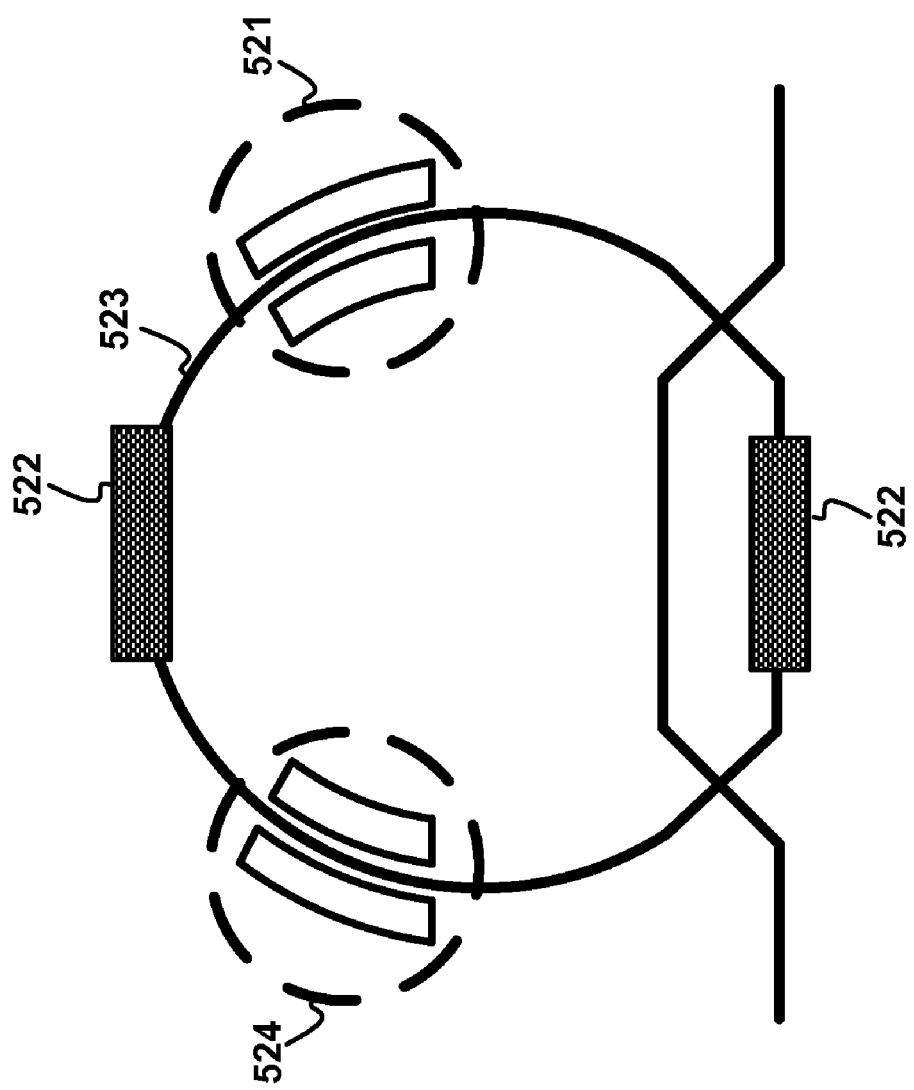
FIG. 5 is a schematic of an optical modulator of FIG. 2, including a tunable loss element, a modulation element, and phase shifters according to the present invention.

FIG. 5 is a schematic showing a modulator 500 such as that depicted in FIG. 2, including a tunable loss element 524, a modulation element 521, and one or more DC phase shifters 522 optically coupled thereto. While not specifically shown in this FIG. 5, the modulation element may advantageously be an electro-optic modulation element, which are well-known to those skilled in the art. Also not specifically shown in this FIG. 5, is that while the resonance ring is shown "outside" of the Mach-Zehnder structure for convenience, it nevertheless may be "within" that structure as constructed.

Advantageously, a device such as that shown in FIG. 5 may be constructed using well-characterized semiconductor processing techniques. In that manner, a preferred "stack" of materials may be constructed from, for example, alternating layers of Si and Ge doped Si layers. As can be appreciated, such processing techniques afford a rich array of materials and dopants from which the devices may advantageously be constructed depending upon the particular application.

Figure 6:
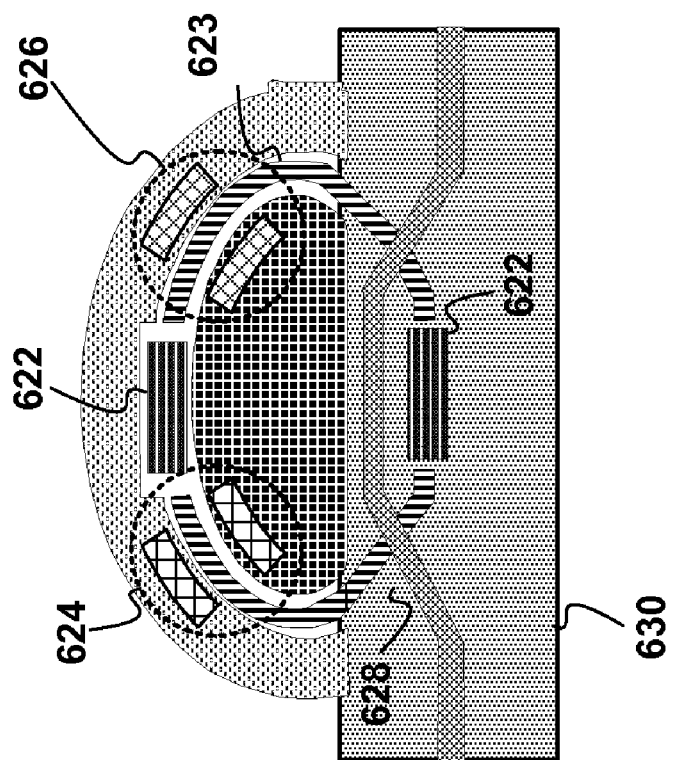
FIG. 6, is a schematic of a concatenated pair of modulators with tunable ring resonator loss according to the present invention.
Figure 6:
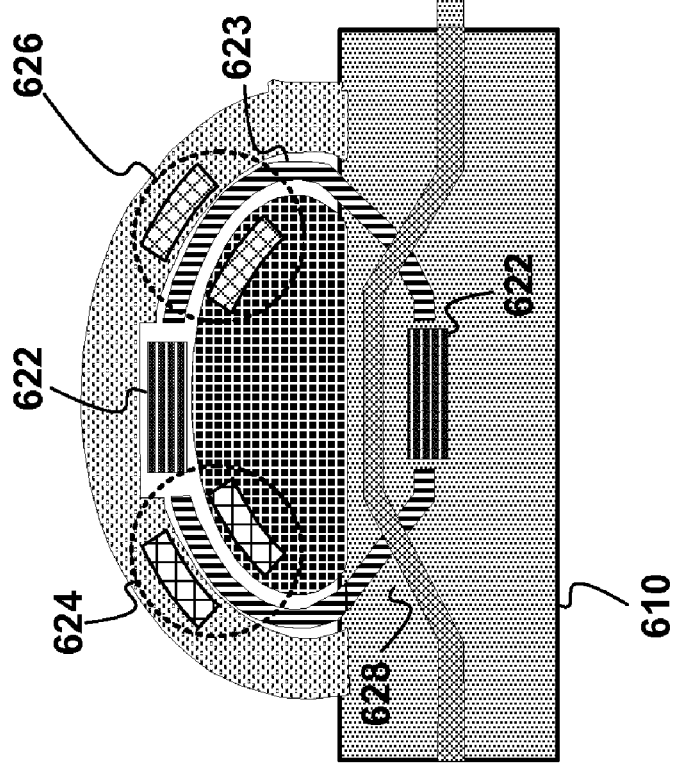

FIG. 6 is a schematic showing concatenated ring modulators constructed according to the present invention wherein each of the resonator rings exhibit a tunable loss. More specifically, and as shown in this FIG. 6, a first modulator 610 includes a resonator ring 623 having one or more DC phase shifters 622, a tunable loss element 626, and a high-speed phase shifter 624, coupled via tunable coupler 628. We note that the modulation and or/loss element may be placed in the ring, the tunable coupler, or both locations. The second modulator 630 is similarly configured.

In preferred embodiments of the structure(s) shown in this FIG. 6, the first device may be tuned to adjust the phase shift while the following or second device may be tuned to adjust the loss or vice-versa. In this manner, significant design flexibility is afforded while still exhibiting relatively straightforward fabrication. Alternatively, both parameters—loss and phase—may be adjusted in both the first and trailing devices.

Figure 7:
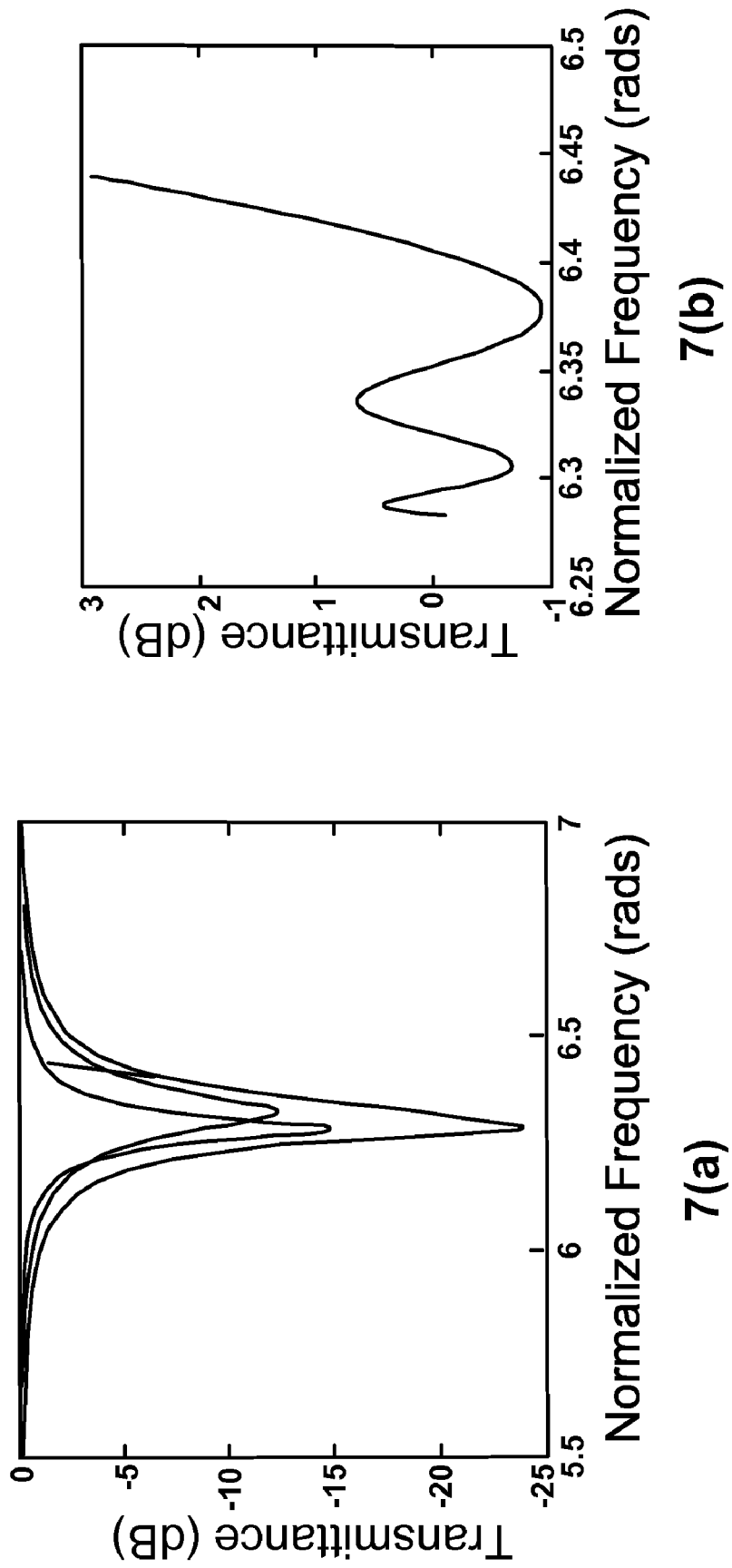
FIG. 7(*a*) is a graph showing an exponential response of the modulator of FIG. 5, and its deviation from the exponential response 7(*b*)

Such a configuration may advantageously produce an exponential response such as that shown in FIG. 7(a) with its deviation from the desired exponential response shown in FIG. 7(b). As can be appreciated by those skilled in the art, resonator loss may be tuned through a variety of mechanisms, including carrier injection mechanisms, or a tunable coupler, thereby reducing modulator deviation from the desired exponential response.

Figure 8:
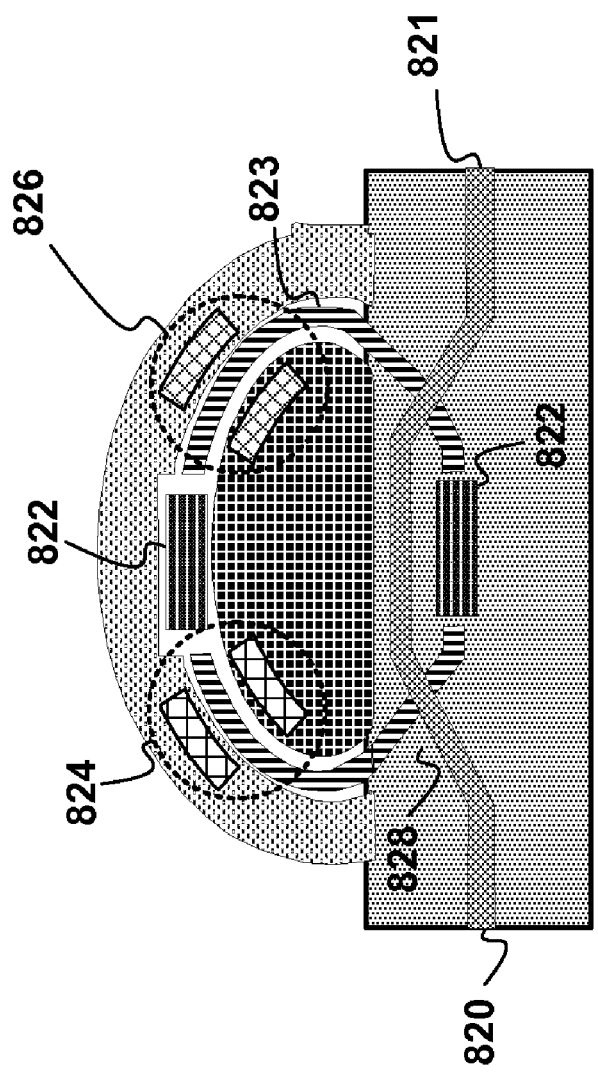
FIG. 8, is a schematic of an optical modulator with tunable loss resonators, modulation elements and phase shifters according to the present invention.

Advantageously, the present invention is not limited to concatenated configuration such as the one shown in FIG. 6. With reference now to FIG. 8, there is shown a single modulator 800 including an input waveguide 820, an output waveguide 821, and a ring resonator 823 having one or more phase shifters 822, tunable loss element 826 and high speed phase shifter 824 coupled via tunable coupler 828. While not specifically shown, such a structure may be selectively tuned to exhibit desirable linear and/or exponential response characteristics.

Figure 9A:
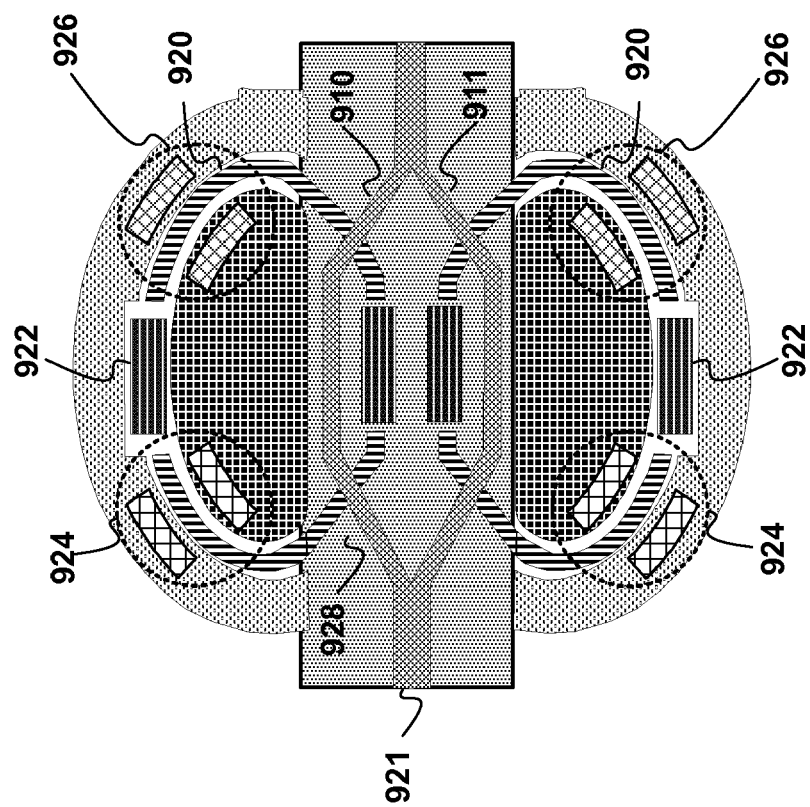
FIG. 9*a*, is a schematic of a balanced modulator with tunable loss ring resonators on each arm and single input and single output constructed according to the present invention.
Figure 9B:
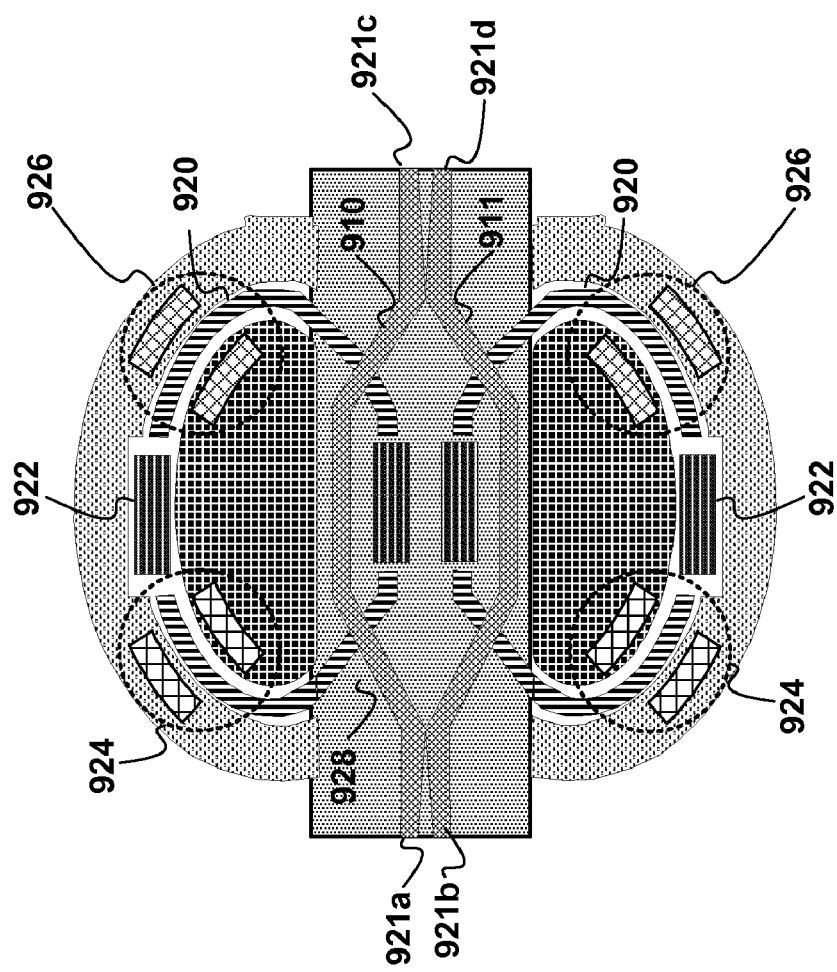
FIG. 9*b*, is a schematic of a balanced modulator with tunable loss ring resonators on each arm and multiple inputs and multiple outputs constructed according to the present invention.
Figure 10:
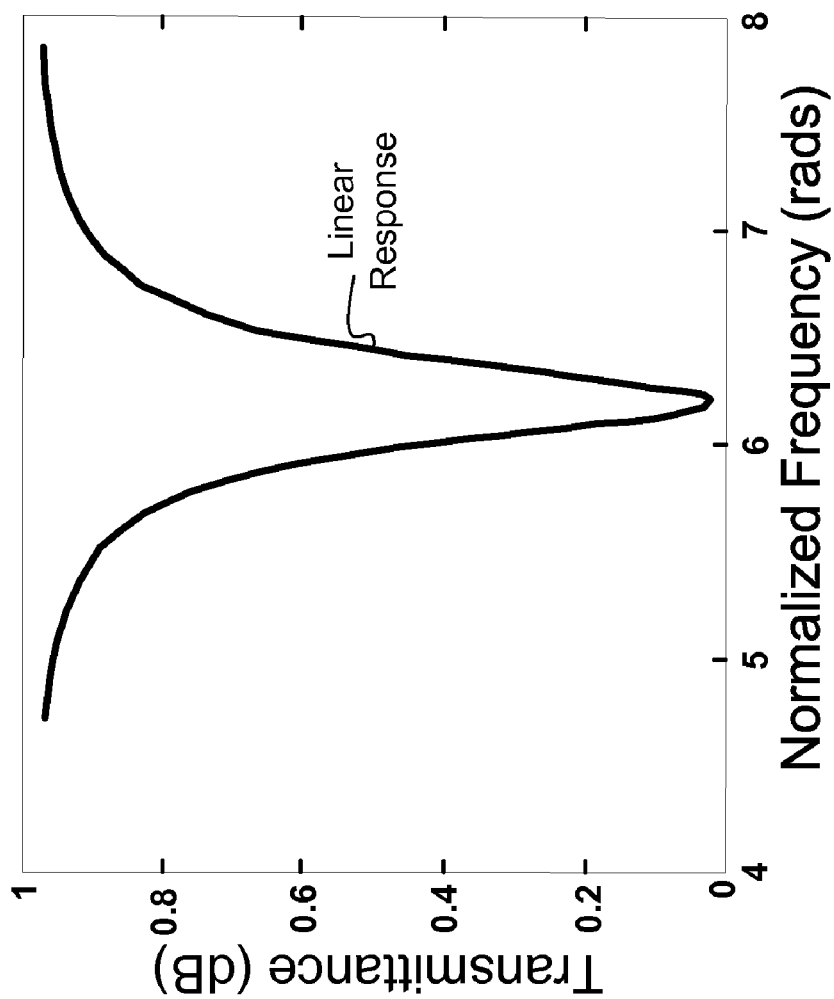
FIG. 10 is a graph showing the linear response of the modulator of FIG. 8.

Further variations of the present invention may be produced using an individual, dual-arm modulator. More specifically, and with reference to FIG. 9(a) a balanced modulator 900(a) is shown wherein each of the two arms 910, 911 includes a ring resonator 920, a DC phase shifter 922, one or more high-speed phase shifter 924, and one or more adjustable, or tunable loss devices 926, such that the ring resonators are optically coupled to the dual-arm modulator by a tunable coupler 928. Advantageously, such a device may be tuned to produce a variety of response characteristics, including a linearized response characteristic such as that shown in FIG. 10. Additionally, while the device shown in FIG. 9(a) has only a single input waveguide 921 and a single output waveguide, it may advantageously be constructed like that shown in FIG. 9(b) having two input waveguides 921(a), 921(b) and two output waveguides 921(c), 921(d)—or even a combination thereof.

At this point, while the present invention has been shown and described using some specific examples, those skilled in the art will recognize that the teachings are not so limited. Accordingly, the invention should be only limited by the scope of the claims attached hereto.

What is claimed is:

1. An optical apparatus comprising:
   an optical modulator having an input waveguide connected to an output waveguide by two waveguide arms, said modulator for modulating an input optical signal; and
   an optical resonator optically coupled to at least one of the two waveguide arms of the optical modulator;
   CHARACTERIZED IN THAT:
   said optical resonator is included in the at least one of the two waveguide arms, and positioned such that it is within the physical waveguide arm and within the light path defined by said arm wherein all light traversing in the arm necessarily traverses the resonator, wherein a plurality of tunable elements positioned within the resonator adjust in a frequency space, a resonance location of the resonator, such that upon modulating the input optical signal present at the input waveguide, the modulator adjusts the modulation response characteristics of a modulated output optical signal at the output waveguide.

2. The optical apparatus of claim 1 wherein said plurality of tunable elements comprises at least one phase shifter and at least one loss element.

3. The optical apparatus of claim 2 wherein said phase shifters and said loss elements are functionally independent from one another.

4. The optical apparatus of claim 1 further comprising:
a second optical modulator having an input waveguide connected to an output waveguide by two waveguide arms, wherein the input waveguide of the second modulator is optically coupled in a concatenated configuration, to the output waveguide of the optical modulator;
a second optical resonator optically coupled to at least one of the waveguide arms of the second optical modulator;
FURTHER CHARACTERIZED IN THAT:
said second optical resonator is included in the at least one of the waveguide arms of the second optical modulator, and positioned such that it is within the physical waveguide arm and within the light path defined by said waveguide arm of the second optical modulator, wherein all light traversing the waveguide arm of the second optical modulator necessarily traverses the second resonator, wherein one or more loss elements positioned within the second resonator adjust in the frequency space, the resonance location of the second resonator,
such that upon modulating the input optical signal, the concatenated modulators linearize the response characteristics of the modulated output optical signal at the output waveguide of the second modulator.

5. The optical apparatus of claim 4
FURTHER CHARACTERIZED BY:
one or more of the loss elements positioned within the second resonator comprise a tunable loss element.

6. The optical apparatus of claim 1 wherein said optical modulator is a two-arm Mach-Zehnder modulator, and said optical resonator is optically coupled to one of the arms,
FURTHER CHARACTERIZED BY:
a second optical resonator optically coupled to, and included in the second arm of the Mach-Zehnder modulator, and positioned within the physical second arm and the light path defined by said second arm, wherein all light traversing the second arm of the modulator necessarily traverses the second optical resonator and wherein the second optical resonator includes one or more loss elements that adjust in the frequency space, the resonance location of the second resonator,
such that upon modulating the input optical signal present at the input waveguide, the modulator adjusts the response characteristics of the output optical signal at the output waveguide.

7. The optical apparatus of claim 6
FURTHER CHARACTERIZED BY:
one or more of the loss elements included in the second resonator are adjustable.

8. The optical apparatus of claim 1 wherein said resonator comprises one or more phase shifters.

9. The optical apparatus of claim 1, wherein the modulator, optically coupled to the resonator, and at least one of the plurality of the tunable elements positioned within the optical resonator forms a tunable optical coupler which optically couples the modulator to the resonator.

10. In an optical device comprising a modulator, a resonator optically coupled to, and positioned within the physical waveguide arm and the light path defined by at least one waveguide arm of the modulator, wherein all light traversing in the waveguide arm necessarily traverses the resonator, and one or more tunable elements positioned within the resonator, a method for altering the modulation response characteristics a modulated output optical signal of the device, said method comprising the steps of:
establishing an initial loss characteristic for the resonator; and;
adjusting the established loss characteristic of the resonator by adjusting the one or more tunable elements,
such that upon modulating an input optical signal, the modulator alters the modulation response characteristic of the modulated output optical signal of the device wherein
said optical device further comprises a second modulator concatenated with the modulator, a second resonator optically coupled to and positioned in the physical waveguide arm and the light path defined by at least one waveguide arm of the second modulator, wherein all light traversing in the at least one waveguide arm of the second modulator necessarily traverses the second resonator, and at least one tunable element positioned within the second resonator, said method further comprising the steps of:
establishing an initial loss characteristic for the second resonator; and;
adjusting the established loss characteristic of the second resonator by adjusting the at least one tunable element positioned within the second resonator,
such that upon modulating the input optical signal the concatenated modulators linearize the modulation response characteristic of the modulated output optical signal of the device.

11. An optical apparatus comprising:
a means for modulating an optical signal, said modulating means including one or more resonators optically coupled to and positioned within the physical modulating means and the light path of said modulating means, wherein all light traversing the light path of the modulating means necessarily traverses one or more of said resonators, wherein at least one of said resonators has a means for generating loss within the resonator and,
a means for adjusting the loss generated;
such that in operation, the resonator is tunably coupled to said modulating means for altering the modulation response characteristics of a modulated optical signal.

12. The apparatus of claim 11 farther comprising:
a means for shifting the phase of optical signals traversing the optical apparatus.

13. An optical apparatus comprising:
a means for modulating an optical signal, said modulating means including one or more resonators optically coupled to and positioned within the physical modulating means and the light path of said modulating means, wherein all light traversing the light path of the modulating means necessarily traverses one or more of said resonators, wherein at least one of said resonators has a means for generating loss within the resonator,
such that in operation, the resonator is tunably coupled to said modulating means for altering the modulation response characteristics of a modulated optical signal and
a second means for modulating an optical signal, said second modulating means including one or more additional resonators optically coupled to and positioned within the physical modulating means, as well as the light path of said second modulating means, such that all light traversing the light path of the second modulating means necessarily traverses the one or more additional resonators, wherein at least one of said additional resonators has a means for generating loss within the additional resonator, such that in operation, the one or more additional resonators is tunably coupled to the second modulating means for altering the modulation response characteristics of the modulated optical signal, wherein one or more of the loss generating means includes a means for providing carrier injection.

* * * * *

UNITED STATES PATENT AND TRADEMARK OFFICE
CERTIFICATE OF CORRECTION

| | | |
|---|---|---|
| PATENT NO. | : 7,561,759 B2 | Page 1 of 1 |
| APPLICATION NO. | : 11/428031 | |
| DATED | : July 14, 2009 | |
| INVENTOR(S) | : Gill et al. | |

It is certified that error appears in the above-identified patent and that said Letters Patent is hereby corrected as shown below:

Col. 1 lines 8-9, please insert the following paragraph:

--Acknowledgement of Government Support. This invention was made with Government support under Contract No. HR0011-05-C-0027 awarded by Electronic &; Photonic Integrated Circuits—Defense Advanced Research Projects Agency (EPIC-DARPA). The Government has certain rights in this invention.--

Signed and Sealed this
Twentieth Day of December, 2011

David J. Kappos
*Director of the United States Patent and Trademark Office*